(12) United States Patent
Son

(10) Patent No.: US 6,554,344 B2
(45) Date of Patent: Apr. 29, 2003

(54) FUEL FILLER DOOR CATCH FOR VEHICLES

(75) Inventor: Byeong-Lag Son, Ulsan-shi (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/087,396

(22) Filed: Mar. 1, 2002

(65) Prior Publication Data
US 2002/0145303 A1 Oct. 10, 2002

(30) Foreign Application Priority Data
Apr. 6, 2001 (KR) .......................... 2001-18199

(51) Int. Cl.⁷ .............................. B62D 25/00
(52) U.S. Cl. .................................... 296/97.22
(58) Field of Search ...................... 296/97.22

(56) References Cited

U.S. PATENT DOCUMENTS

| | | | |
|---|---|---|---|
| 2,869,391 A | * | 1/1959 | Brock |
| 4,331,353 A | * | 5/1982 | Yazawa et al. |
| 4,525,004 A | | 6/1985 | Tanaka |
| 4,633,724 A | * | 1/1987 | Mochida |
| 4,758,811 A | | 7/1988 | Slavin et al. |
| 4,917,418 A | * | 4/1990 | Gokee |
| 4,958,536 A | | 9/1990 | Baumgarten |
| 4,988,133 A | | 1/1991 | Shih |
| 5,044,678 A | * | 9/1991 | Detweiler |
| 5,048,878 A | | 9/1991 | Takeshita et al. |
| 5,076,622 A | | 12/1991 | Detweiler |
| 5,222,774 A | | 6/1993 | Fukumoto et al. |
| 5,520,431 A | | 5/1996 | Kapes et al. |
| 5,611,580 A | | 3/1997 | Choi |
| 5,664,811 A | | 9/1997 | Martus et al. |
| 6,007,141 A | | 12/1999 | Thomas et al. |

FOREIGN PATENT DOCUMENTS

DE    4210084    3/1992

* cited by examiner

Primary Examiner—D. Glenn Dayoan
Assistant Examiner—Scott Carpenter
(74) Attorney, Agent, or Firm—Pennie & Edmonds LLP

(57) ABSTRACT

The fuel filler door catch includes a catch body mounted to a fuel filler housing, a rotary unit mounted on the catch body and rotating as a driver manipulates a cable, and a catch slide performing a rectilinear sliding movement as the rotary unit is operated, and released from a hook plate provided on a fuel filler door to open the fuel filler door. The present invention is directed to provide a fuel filler door catch, which is operated without applying a great force, in addition to an improvement of durability and a facilitation of maintenance due to a modular structure.

8 Claims, 3 Drawing Sheets

FUEL FILLER DOOR CATCH FOR VEHICLES

FIELD OF THE INVENTION

The present invention relates generally to a fuel filler door catch for vehicles, and more particularly, to a fuel filler door catch for vehicles, which can be manipulated without applying a great force, thereby improving a durability of parts included in the fuel filler door catch.

BACKGROUND OF THE INVENTION

The fuel filler door is opened when filling fuel in a fuel tank, and a door catch is used for opening and closing the fuel filler door. The door catch is operated by a release handle, that is, a switch lever disposed within reach of a driver's seat.

FIG. 1 shows a conventional fuel filler door catch as well as a general fuel filler door. The fuel filler door 2 is hinged to a fuel filler housing 1 by means of a hinge 3 and a spring 4. A hook plate 5 is installed to an opposite side portion of the fuel filler door 2 and locked to the catch mounted to the fuel filler housing 1.

This door catch includes a catch housing 10, a catch slide 12 and a coil spring 13. The catch housing 10 is fastened to the fuel filler housing 1 by fastening members, such as bolts. The catch housing 1 accommodates a catch slide 12 and a coil spring 13. The catch slide 12 is integrated with a cable extending in a straight line. The catch slide 12 moves rectilinearly in accordance with a manipulation by a driver, thus opening the fuel filler door.

However, since such a door catch is designed to integrate the catch slide 12 with the cable 7 extending in a straight line, the cable 7 must be bent in a U-shape so as to be connected to a release handle disposed within reach of a driver's seat. Thus, a conventional fuel filler door catch has a problem in that a great force must be applied to move the catch slide 12 rearward by means of the release handle for opening the door 2. Furthermore, since the catch slide 12 is integrated with the cable 7, the conventional fuel filler door catch has another problem in that it is difficult to repair the fuel filler door catch. In addition, since the catch housing 11 has to be fastened to the fuel filler housing 1 by additional fastening members 11, 11', the conventional fuel filler door catch has still another problem in that it consumes labor and time during its production.

SUMMARY OF THE INVENTION

The present invention provides a fuel filler door catch for vehicles, which can be operated without applying great force, in addition to simplifying its assembly and maintenance due to a modular structure. A fuel filler door catch according to the invention includes a catch body mounted to a fuel filler housing, a rotary unit mounted on the catch body and rotating as a driver manipulates a cable, and a catch slide performing a rectilinear sliding movement as the rotary unit is operated, and released from a hook plate provided on a fuel filler door to open the fuel filler door.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
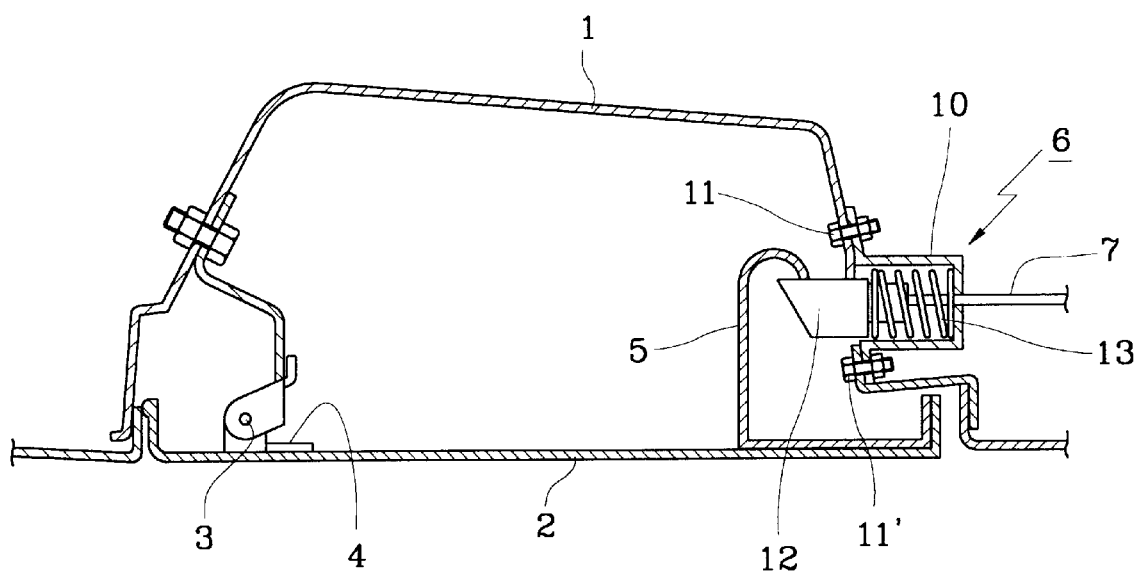
FIG. 1 is a sectional view showing a conventional fuel filler door catch for vehicles.

Reference is now made to the drawings, in which the same reference numerals are used throughout the different drawings to designate the same or similar components.

Figure 2:
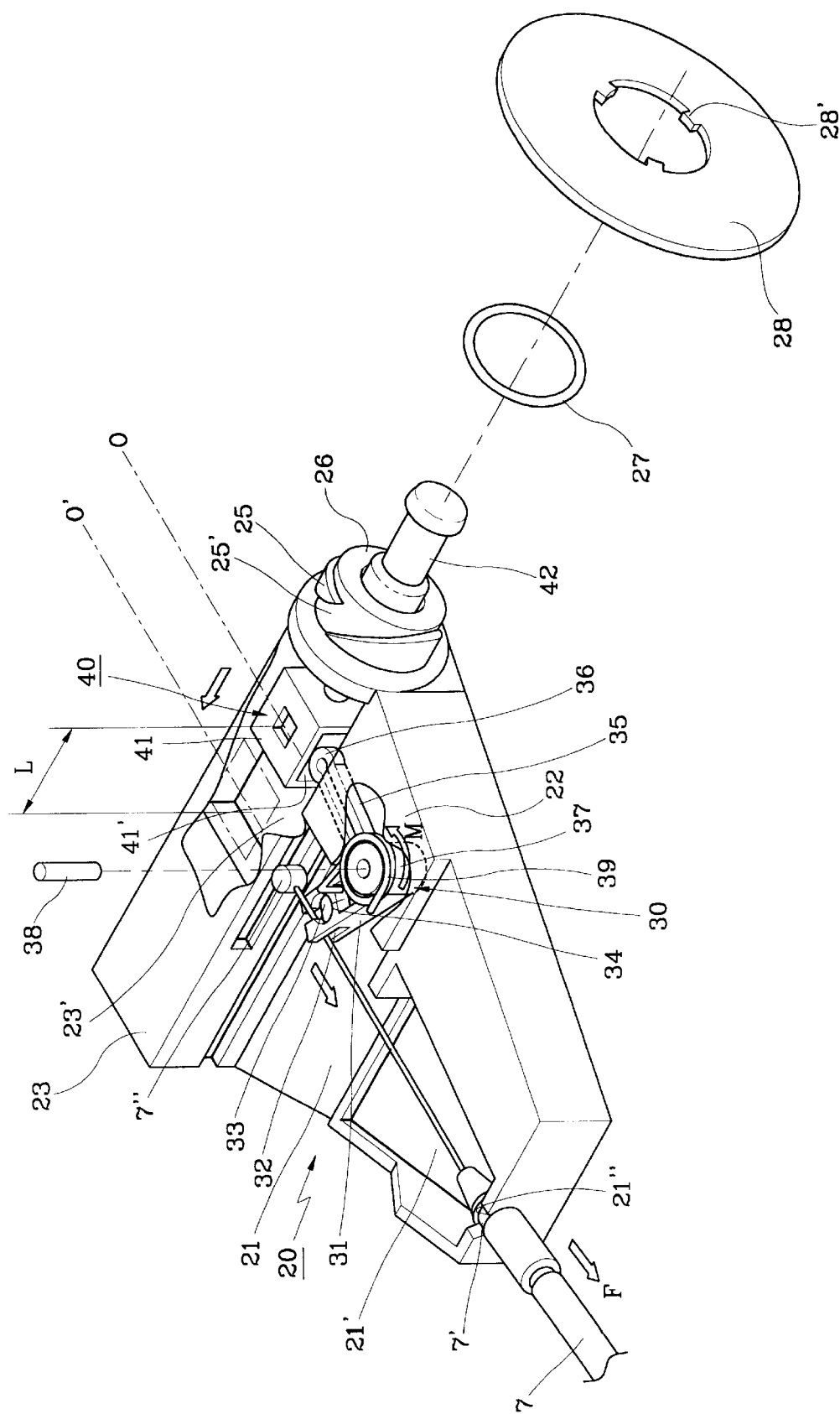
FIG. 2 is an exploded perspective view of a fuel filler door catch according to the present invention.

FIG. 2 is a perspective view of the fuel filler door catch for vehicles according to the present invention. The fuel filler door catch includes a catch body 20, a rotary unit 30 and a catch slide 40. The catch body 20 is mounted to a support plate 28 of the fuel filler housing. The rotary unit 30 is mounted on the catch body 20 and rotates by a movement of the cable 7 connected to a release handle manipulated by a driver. The catch slide 40 performs a rectilinear sliding movement as the rotary unit 30 is operated, and is released from a hook plate 5 provided on a fuel filler door 2 to open the fuel filler door 2.

The catch body 20 includes a base 21, a seat part 21', a support part 22 and a slide reception part 23. The base 21 has a flat shape in order not to interfere with a movement of the rotary unit 30. The seat part 21' is formed on the front portion of the base 21 and provided on its end wall with a circular seat opening 21" for receiving the locking tip 7' of the cable 7. The support part 22 is formed on the side portion of the base 21 and has a hollow interior for receiving and supporting the rotary unit 30 connected to the locking pin 7" of the cable 7. The slide reception part 23 is formed on the rear portion of the base 21 and receives the catch slide 40 within a channel 23' having a length L. This catch slide 40 moves rectilinearly to be released from the hook plate 5 by a rotation of the rotary unit 30.

The slide reception part 23 is provided on its one end with a locking shaft 26 for connecting the catch body 20 to a support plate 28 of the fuel filler housing. Three rows of helical slots 25 are formed on the outer circumferential surface of the locking shaft 26. On the other hand, three protrusions 28' are formed on the inner edge of the support plate 28. The helical slots 25 engage with the protrusions 28' to rotate therewith, thus allowing the locking shaft 26 and the support plate 28 to be easily assembled. An airtight ring 27 is disposed between the catch body 20 and the support plate 28 such that the catch body 20 is connected to the support plate 28.

The rotary unit 30 includes a rotary boss 37, a cable hook arm 31, and an actuation arm 35. The rotary boss 37 is disposed within the support part 22 of the catch body 20 and rotatably hinged to the support part 22 by a hinge pin 38. The cable hook arm 31 is integrated with the rotary boss 37 and connected to the locking pin 7" of the cable 7. The actuation arm 35 is mounted to the rotary boss 37 while being spaced at an angle of 90° or more from the cable hook arm 31, and moves the catch slide 40 received in the channel 23' of the slide reception part 23.

Figure 3:
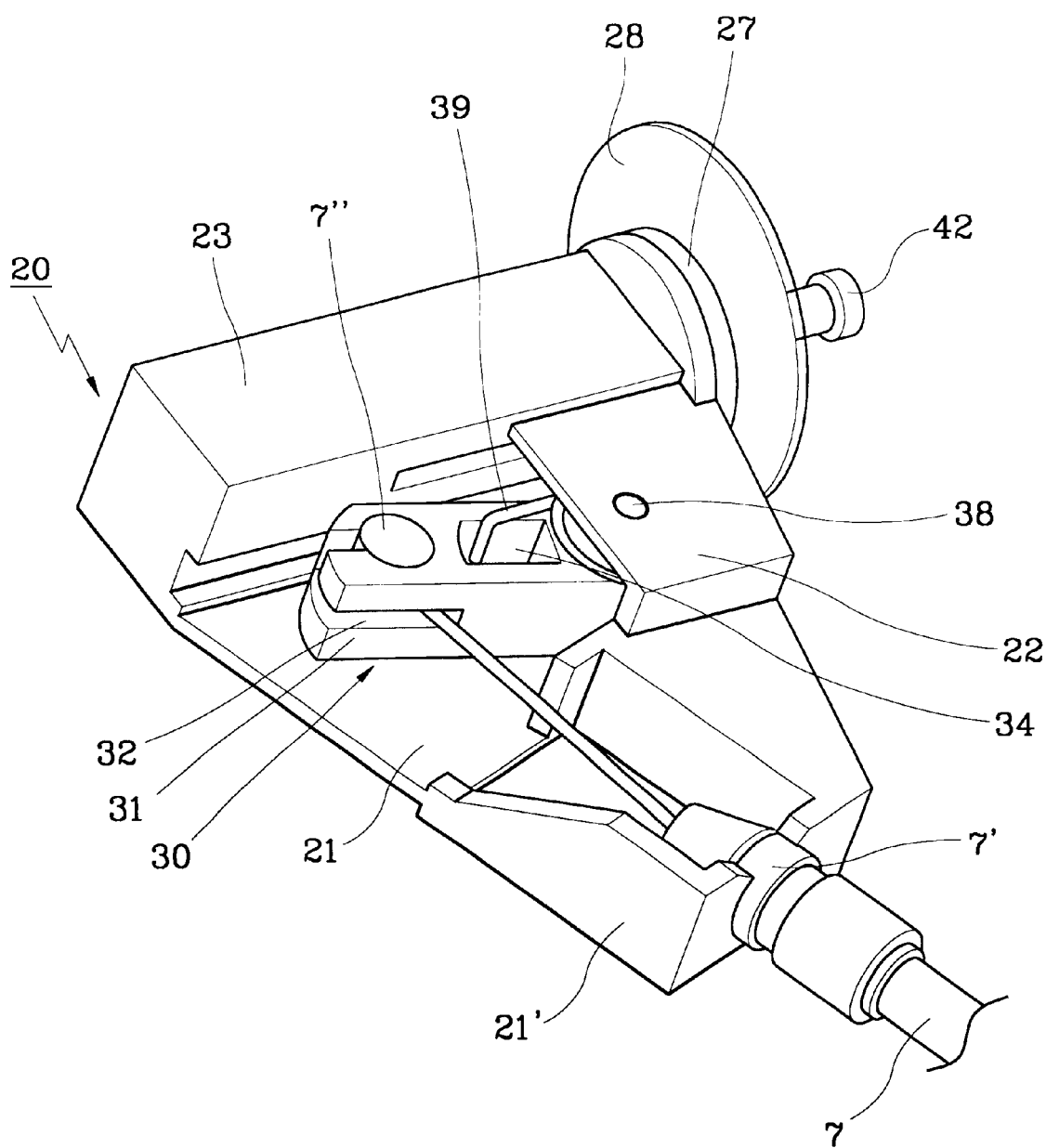
FIG. 3 is a perspective view of the fuel filler door catch of this invention, where the elements of the door catch is assembled into a single structure.

As shown in FIG. 3, the cable hook arm 31 includes a slit 32 for receiving the cable 7, and a pin slot 33. This pin slot 33 is formed on the top of the cable hook arm 31 above the slit 32, and receives the locking pin 7" of the cable 7. In addition, the cable hook arm 31 is provided on its top surface with a stop slot 34 for holding an end of a biasing unit 39. The biasing unit 39, that is a torsion spring, is connected to the rotary boss 37, and generates an elastic force so as to return the rotary unit 30 to its original position after the rotary unit 30 is rotated by the manipulation of the cable 7.

The actuation arm 35 has a longitudinal slit for reducing its weight. The contact end 36 of the actuation arm 35 is enlarged in size to increase its contact force relative to the catch slide 40.

It is preferable to dispose a bearing (not shown) between the rotary boss 37 and the hinge pin 38 for reducing a rotation resistance.

The catch slide 40 includes a movable block 41 and a stop rod 42. The movable block 41 has an opening for receiving the contact end 36 of the rotary unit 30. The stop rod 42 is integrated with the movable block 41, and protruded out the locking shaft 26 of the slide reception part 23 of the catch body 20 such that the stop rod 42 is caught by or released from the hook plate 5.

The operation of the fuel filler door according to this invention will be described in detail.

When the driver pulls the release handle disposed within reach of the driver's seat for opening the fuel filler door, as shown in FIG. 2, the cable 7 connected to the release handle is also pulled, and then the cable hook arm 31 of the rotary unit 30 is moved in the same direction as the moving direction of the cable 7.

Therefore, when the cable hook arm 31 of the rotary unit 30 is rotated, the rotary boss 37 hinged to the support part 22 of the catch body 20 by the hinge pin 38 generates a rotation moment M, and then the actuation arm 35 integrated with the rotary boss 37 makes the catch slide 40 move in the channel 23' having the length L of the slide reception part 23.

At this time, the biasing unit 39 also moves by the movement of the cable hook arm 31 of the rotary unit 30 while generating a torsion stress. The torsion stress of the biasing unit 39 serves as an elastic force for returning the rotary unit 30 to the original position when the manipulation force F of the cable 7 is removed.

The movable block 41 of the catch slide 40 is moved from the original position "O" to the open position "O'" along the channel 23' of the length L by the actuation arm 35 of the rotary unit 30. The stop rod 42 integrated with the movable block 41 of the catch slide 40 slidably moves in the locking shaft 26 of the slide reception part 23, so the stop rod 42 is released from the hook plate 5 of the fuel filler door 2, thus opening the fuel filler door 2.

On the other hand, when the driver removes the force from the release handle, the torsion stress of the biasing unit 39 generated by the rotary unit 30 rotated by the cable 7 is removed. The biasing unit 39 thus supplies a reverse rotation moment to the rotary boss 37 for elastically returning the cable hook arm 31 of the rotary unit 30 to its original position.

Therefore, the actuation arm 35 returns to its original position, so the catch slide 40 returns from the opening position O' to the original position O along the channel 23' of the length L of the slide reception part 23. As a result, the stop rod 42 is protruded out from the locking shaft 26 of the slide reception part 23, and simultaneously moves to the hook plate 5 of the fuel filler door 2, thus maintaining the fuel filler door 2 in a closed state.

As described above, the present invention provides a fuel filler door catch, which converts the manipulation force F applied to a cable by a driver into a rotation moment M by means of a rotary unit, and rectilinearly moves a catch slide for opening and closing a fuel filler door, thus rectilinearly moving the catch slide without applying a great force by using both a difference of the length between a cable hook arm and an actuation arm in addition to an angle between the cable hook arm and the actuation arm. The fuel filler door catch of this invention has a modular structure designed to connect the rotary unit to a cable using a locking pin of a cable and a pin slot, and to detachably mount a catch body to the support plate of a fuel filler housing with a simple manipulation, thus facilitating the maintenance thereof.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fuel filler door catch for vehicles, comprising:
a catch body mounted to a fuel filler housing comprising:
a base having a flat shape in order not to interfere with a movement of said rotary unit;
a seat part formed on a front portion of said base and provided on an end wall thereof with a circular seat opening for receiving a locking tip of the cable;
a support part formed on a side portion of said base and having a hollow interior for receiving and supporting said rotary unit, and wherein said cable is further provided with a locking pin which is connected to said rotary unit;
a slide reception part formed on a rear portion of said base and receiving said catch slide within a channel thereof having a length L, with said catch slide rectilinearly moving to be released from said hook plate by a rotation of said rotary unit, wherein said slide reception part is provided on an end thereof with a locking shaft for connecting said catch body to a support plate of the fuel filler housing, said locking shaft having a plurality of helical slots, and said support plate having a plurality of protrusions corresponding to the helical slots;
a rotary unit mounted on said catch body and rotating as a driver manipulates a cable; and
a catch slide performing a rectilinear sliding movement as said rotary unit is operated, and released from a hook plate provided on a fuel filler door to open the fuel filler door.

2. The fuel filler door catch according to claim 1, wherein said rotary unit comprises:
a rotary boss disposed within the support part of said catch body and rotatably hinged to said support part by a hinge pin;
a cable hook arm integrated with said rotary boss and connected to said locking pin of the cable; and
an actuation arm mounted to said rotary boss while being angularly spaced from said cable hook arm and moving said catch slide received in the channel of said slide reception part.

3. The fuel filler door catch according to claim 2, wherein said cable hook arm comprises:
a slit for receiving said cable; and
a pin slot formed on top of the cable hook arm above said slit and receiving said locking pin of the cable.

4. The fuel filler door catch according to claim 2, wherein said actuation arm is spaced from the cable hook arm at an angle of 90° or more.

5. The fuel filler door catch according to claim 2, wherein said actuation arm has a longitudinal slit for a weight reduction thereof, with a contact end of the actuation arm enlarged in size to increase a contact force relative to said catch slide.

6. The fuel filler door catch according to claim 2, wherein said rotary boss has a biasing unit for elastically returning said rotary unit to an original position after the rotary unit is rotated by a manipulation of the cable, said biasing unit being stopped at an end thereof by a stop slot formed on a top surface of said cable hook arm.

7. The fuel filler door catch according to claim 5, wherein said biasing unit is a torsion spring.

8. The fuel filler door catch according to claim 1, wherein said catch slide comprises:
 a movable block having an opening for receiving a contact end of the rotary unit; and
 a stop rod integrated with said movable block, and protruded out a locking shaft of the slide reception part of the catch body such that the stop rod is caught by or released from the hook plate.

* * * * *